May 17, 1932. A. LE GRAND 1,858,513
DATE PROTECTOR OR SHIELD
Filed June 19, 1930
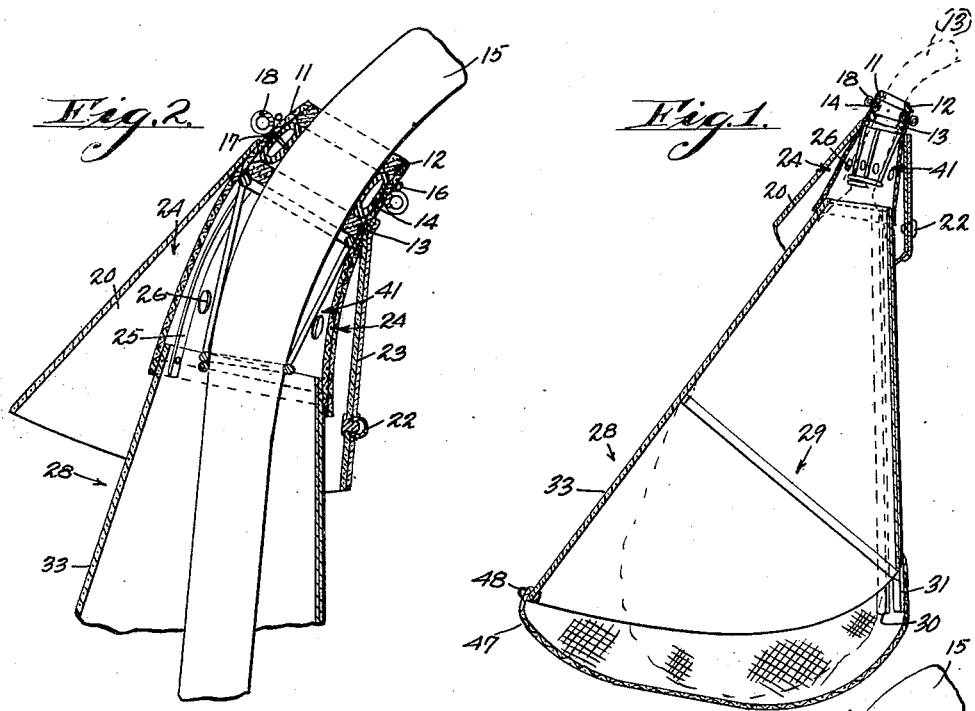
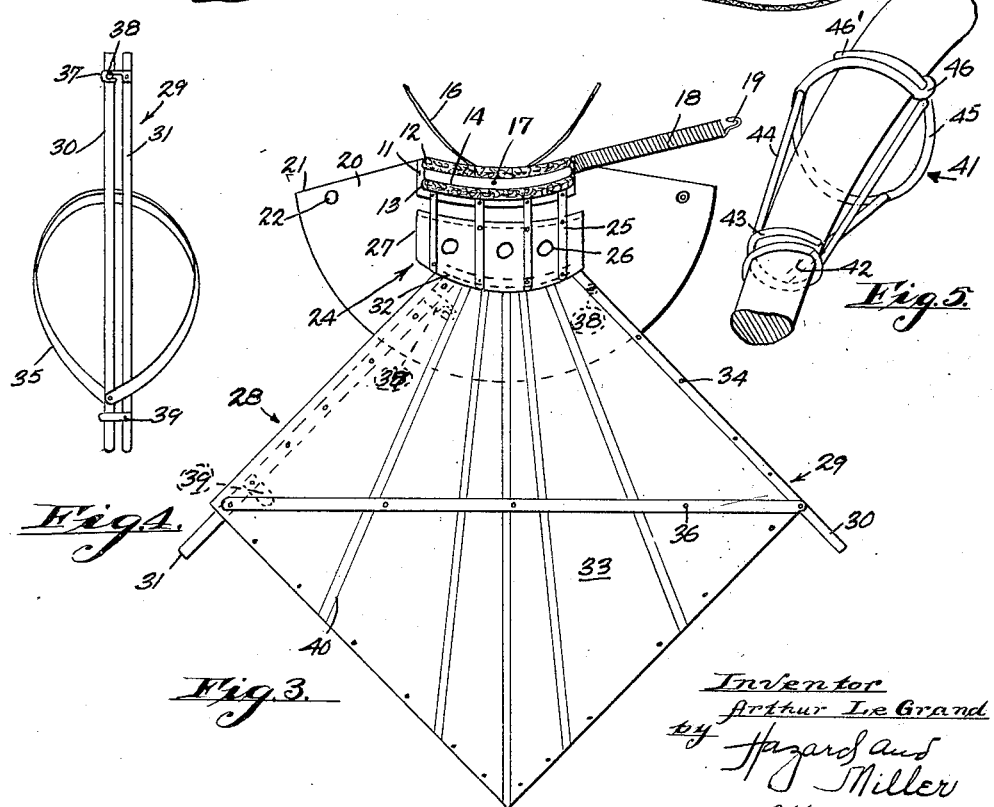
Inventor
Arthur Le Grand
by Hazard and Miller
Attorneys

UNITED STATES PATENT OFFICE

ARTHUR LE GRAND, OF INDIO, CALIFORNIA

DATE PROTECTOR OR SHIELD

Application filed June 19, 1930. Serial No. 462,279.

My invention has to do with a protector or shield for growing dates to protect these during their growth and still allow picking of the crop.

In the cultivation of dates on a commercial scale it is necessary or advisable to protect the bunches of dates, especially from moisture. While the commercial cultivation of dates in this country is usually carried on in arid districts where there is very little rain, where the moisture for the support of the trees is usually obtained from irrigation, nevertheless, during the time of the growing and maturing of the fruit there are sometimes rains sufficiently heavy to cause a serious damage to the fruit. The bunches of dates grow on the ends of relatively long, stiff, but bendable stalks which incline downwardly, and the growing bunch of dates during rainstorms is subjected not only to the rain falling on the bunch itself but to the rain water which runs down the stem, and is drained from the large leaves or stalks of the tree. As the dates are tightly clustered together on the stalk, the moisture causes these to mold and decay, thus frequently spoiling a large number of dates on a bunch, if not the entire bunch of dates. The damage by water is frequently increased as it sometimes happens after rainstorms that the dates are subject to hot, sunshiny weather.

An object of my invention, therefore, is a shield which may be attached to the stalk carrying the dates and which shield is designed to catch the water running down the stalk and to drain this clear of the bunch of dates, and, also, in addition, I provide this shield with a portion covering substantially the whole bunch of dates, which protects them from the direct rainfall and the rain dripping off the leaves and stalks of the tree.

Another characteristic of my invention is that the shield provides for circulation of air, as it is necessary to have the air circulate freely around the bunch of dates for them to properly mature; and another characteristic of my invention is that it may be opened and slipped up the stem to allow picking of the dates, as dates in the same bunch ripen at different times and the bunch has to be picked over frequently to obtain all the marketable dates.

Another characteristic of my invention is that I provide a shield made of material which allows a certain transmission of sunlight and which will allow the dates to receive the ultra-violet rays, as it is found that direct sunlight and the ultra-violet rays are necessary for the production of the finest quality of dates. I find a suitable material to form the shield is a fabric sometimes used in poultry houses made of a woven wire mesh material with a transparent filling substance in the interstices of the wire mesh.

In constructing my invention I employ what I term a cuff structure having at the top a band which may be tied around the stalk carrying the bunch of dates and this cuff is provided with fibrous strips, such as strips made of hemp, and with this I utilize, preferably, a rubber tube which may be bound tightly around the stalk. The rubber is protected from the direct sunlight so that it does not deteriorate as rapidly as if exposed to the sun, and the fiber, such as hemp, swells when subjected to water running down the stem and forms a tight seal on the stem. The cuff flares outwardly and is preferably fastened on the under side of the stem with suitable fasteners. Below the cuff I utilize a neck piece which is connected to the cuff and has a series of openings for ventilation, as well as, preferably, resilient strips to hold the neck expanded. At the lower part of the neck there is a flaring shield which has a metal reinforcement or frame, this frame having fastening means on the under side of the bunch of dates. The shield effectively protects the dates from the direct rain or the water dripping from the branches, and any water which may run off the cuff, said water being manifestly the water from the stem, is diverted.

In addition to this I utilize a spacing frame around the stalk or stem which engages the upper end of the bunch and holds the collar, the cuff, and the shield positioned above the bunch of dates. The shield may be slipped up on the stem and also opened up to allow picking of the ripe dates.

My invention is illustrated in connection with the accompanying drawings, in which:

Fig. 1 is a vertical, sectional view through my protector or shield when in position, encasing the bunch of dates.

Fig. 2 is a section similar to Fig. 1, enlarged, of the upper portion of the protector or shield.

Fig. 3 is an elevation of the shield opened up and spread apart.

Fig. 4 is an elevation of the metal frame of the protector or shield.

Fig. 5 is a perspective view of the spacing frame.

The device for fastening on the stem to secure a water tight connection employs a collar structure 11 which may be made of fabric or the like and has an upper and a lower band 12 and 13 formed of material which will expand or swell when subjected to moisture, such as hemp or other similar material. This collar is formed in a strip as indicated in Fig. 3, and adapted to fit between the bands 12 and 13 there is a rubber tube 14. This also wraps around the stem, such stem being indicated by the numeral 15. The stem on the date tree is not circular but is somewhat flat on one side, having a convex curve on the other side. However, this collar may be wrapped around the stem. On the outside I have a cord 16, which cord is adapted to pass through a perforation 17 in the collar and also through a perforation in the rubber tube holding this in place, and such cord may be wrapped around the outside of the neck portion, binding this tightly on the stem. In addition, to give a tight, clamping action, I employ a coiled spring 18 which is secured to one end of the collar, and such spring is adapted to wrap around this collar on the outside as shown in Figs. 1 and 2, and by means of a hook 19 on the end of the spring it may be clamped tight.

Attached to the collar there is a cuff structure 20. This cuff has terminal edges 21 which are provided with fasteners such as dome fasteners 22 so that the cuff extends around the stem and overlaps as indicated at 23 in Fig. 2. The fasteners are secured together and thus give a protective cuff strip connected to the collar.

Inside of the cuff structure I employ a neck band 24, which, if desired, may be formed integral with the collar 11, being made of one similar piece of fabric or other material which will remain fairly stiff. This has, preferably, a series of stiffening stays 25 to maintain the neck band sufficiently stiff and prevent it from sagging or crumpling into a tight pack as hereinunder detailed. The neck band is provided with a series of openings or perforations 26. This band has terminating ends 27 which are adapted to overlap when the collar and the cuff are secured around the stem, but it is not necessary to have fasteners on this neck band.

Attached to the neck band I employ a shield designated generally by the numeral 28. This is formed of sheet material 33 and has a stiffening and supporting frame designated generally by the numeral 29. Such frame comprises two rods or stays 30 and 31 which are stitched or otherwise secured to the neck band 24 as indicated at 32 in Fig. 3. The sheet material 33 forming the shield is fastened to the rods 30 and 31 by rivets 34 or other suitable fasteners, and there is a flexible spreading strip 35 attached to each of the rods 30 and 31 and also secured to the covering material by rivets 36 or the like. Or, if desired, this may be left free without attachment. In order to hook the shield in an encircling, overlapping manner around the bunch of dates one of the rods is indicated as having a hook-like plate 37 which engages a stud 38 on the other rod, and at the bottom there is a flat plate 39 secured to one of the rods and overlapping the other, holding these in a clamping position as indicated in Fig. 4. This causes the shield to encircle and encase the bunch of dates as indicated in Fig. 1. In order to strengthen and stiffen the sheet material forming the shield I may have a series of tapes 40 preferably extending from the neck band to the end of the shield.

In order to space the protector above the bunch of dates I provide a spacing frame designated generally by the numeral 41 (Fig. 5). This has a lower ring 42 formed of wire having a split section 43. The wire may be formed in a simple, helical coil with an overlapping turn, such that it may be opened and spread apart to fasten around the stem. Extending upwardly from this ring there are a series of wire rods 44, three of these being illustrated, and such are preferably spot welded to the ring 42. At the top there is a wire ring 45 of fairly large diameter and this has an eye 46 at one end adapted to fit over a free end 46' of the ring. The eye is adapted to abut against one of the rods 44, which rods are preferably spot welded to the upper ring and, therefore, form a limit of the contraction of this upper ring 45.

When the protector is fastened around the stem and the bunch of dates it forms a partial cone. The lower ring 42 of the spacing frame is adapted to engage the upper part of the bunch of dates and the upper ring 45 fits snugly underneath the neck engaging the collar portion, and may fit underneath the expanding band 13. Thus the neck and the shield depend from this spacing frame and as the stem and bunch of fruit swings in the wind a certain ventilation is effected through the openings in the neck.

The neck structure is held stiff by the stays 25, or it may be made of a stiff material which will not require any reinforcing. The perforations or openings 26 through the neck band allow for the circulation of air but no water can enter through these openings as the cuff 20 extends downwardly over these openings and over the lower edge of the neck band.

My protector functions somewhat as follows: Any water or rain running down the stem 15 first dampens the exposed bands 12 and 13, causing the fibers in these bands to swell and form a tight closure around the stem. On account of the rubber tube or packing being inside of the collar it is protected from the direct sunlight and, hence, does not deteriorate as rapidly as if exposed, although, manifestly, the rubber deteriorates on account of the excessively high temperatures where dates can be grown, and such rubber tube will probably require replacing every year.

The water, therefore, which runs down the stem or drips from the leaf stalks, or falls directly on the shield, is first deflected by the cuff past the neck band, and any water falling on the fabric of the shield runs off the fabric, and, hence, the bunch of dates is adequately protected from rain or similar moisture.

When it is desired to pick dates, the fasteners 37 and 39 may be disengaged, allowing the spreading apart of the shield; the resilient strip 35 aiding in this. The cuff may also be unfastened, if necessary, but the collar is left clamped on the stem. The spacing frame and the collar may be shifted up on the stem, thus giving access to the bunch of dates on all sides.

It is desirable, in fact, practically necessary, for the proper ripening of dates that they be exposed directly to the sunlight and to the ultra-violet rays of the sun, therefore, I preferably make the shield part 33 of a material which will transmit light and also will allow a certain amount of the ultra-violet rays to pass. I find a convenient material for this purpose is a fabric formed of a fine, woven wire which has the openings or interstices closed with a transparent material. The wire in this gives a reinforcing and stiffening action and thus holds the shield in proper shape. The cuff portion does not need to be transparent and may be formed of any suitable sheet material which will shed the rain and, in fact, a heavy oiled paper or oiled cloth is satisfactory. The neck band may be made of heavy fabric as may also the collar band, and, as above mentioned, these may be formed in one or two pieces if desired.

Instead of forming the shield 33 of the woven wire having the transparent filling I may use a cloth suitably waxed or oiled or coated with shellac or varnish to make it partially transparent. I find that I can obtain sufficient transparency in this manner for the passage of sunlight to the dates. If a cheaper construction is desired, paper which is waxed, oiled, or coated with shellac or varnish may also be used to form the shield.

In some cases I have a netting 47 which may be secured to the lower end of the shield by detachable fasteners 48 and thus enclose the dates completely, preventing insects or the like from having access to the bunch of fruit. This netting can readily be detached or opened for picking the dates. In picking the dates it is not necessary to completely open up the neck portion of the protector or the collar portion, as the rods 30 and 31 may be disconnected at the latch structure formed by the plate 39 and may be pivoted on the stud 38 engaging the hook-like plate 37 at the top. This allows these rods to spread apart and to be held in an expanded position by the resilient spreading strip 35. It is obvious that this spreading strip may be placed either inside or outside of the covering shield and be secured thereto in any desired manner if necessary.

Various changes may be made in the details of construction without departing from the spirit or scope of the invention as defined by the appended claims.

I claim:

1. A protector for fruit comprising a collar structure adapted to be secured around a stem above the fruit to restrict moisture running down the said stem, and a shield covering the fruit to shed and deflect moisture and moisture falling directly on the fruit, said collar forming the sole supporting means for the shield.

2. A protector for fruit comprising a band having terminal ends adapted to wrap around a stem carrying a bunch of fruit, means in the said band to form a substantially water-tight connection with the stem to deflect water flowing down the stem, and a shield connected to the band covering the bunch of fruit to shed the water so deflected and water flowing directly on the bunch of fruit, said band forming the sole support of the shield.

3. A protector for fruit comprising a collar band with means to secure said band around a stem carrying a bunch of fruit, said collar having a medium in contact with the stem having the characteristics of swelling when subjected to moisture and thus forming a substantially water-tight joint at the said stem, and a shield connected to the collar and depending downwardly over a bunch of fruit to shed the water diverted from the collar and water flowing directly on the bunch of fruit, said band forming the sole support of the shield.

4. A protector for fruit as claimed in claim 3, a connecting structure having a ventilating means between the shield and the collar to allow flow of air through the shield and above the bunch of fruit.

5. A protector for fruit having a collar structure with means to attach said structure around a stem carrying a bunch of fruit and to form a tight connection to shed water, a shield, supporting means connecting the shield and the collar, the shield being adapted to extend over a bunch of fruit, and a cuff connected to the collar and extending over said connection means and adapted to deflect water from the collar past the said connecting means to the shield, and the shield being adapted to deflect water from the bunch of fruit.

6. A protector as claimed in claim 5, a spacing frame on the stem above the fruit adapted to engage the upper part of the bunch of fruit and having an upper part to engage the said protector to space the said protector in proper relation to the bunch of fruit.

7. A protector for fruit comprising in combination a band having terminal ends with means to wrap said band around a stem with fruit to form a substantially water-tight connection, a neck structure depending from the collar, and a shield connected to the neck structure, the neck structure being adapted to wrap around the stem and the shield to wrap around the bunch of fruit, the collar being adapted to deflect water flowing down the stem and the shield to deflect water from the bunch of fruit.

8. A protector for fruit as claimed in claim 7, a cuff structure connected to the collar and extending downwardly over the neck to deflect water on to the shield.

9. A protector for fruit as claimed in claim 7, a cuff structure adapted to wrap around the said neck on the outside thereof and form a water deflector between the collar and the shield, the said cover being spaced from the neck, and the neck structure having a series of ventilating openings therein underneath the cuff.

10. A protector for fruit comprising a band structure having terminal ends and adapted to form a collar in wrapping around a stem carrying a bunch of fruit, said band having strips of fibrous material in contact with the stem adapted to swell when subjected to moisture, a spring means to resiliently press such strips in contact with the stem, a shield to cover the bunch of fruit, and means connecting the shield to the said collar, the said shield and the connecting means being adapted to open on one side to allow exposure of the fruit for picking, leaving the collar attached to the stem.

11. A protector for fruit as claimed in claim 10, a spacing frame having a lower and an upper split ring to encircle the stem, the lower ring being adapted to engage the upper part of a bunch of fruit and the upper ring to engage the collar and to support the shield in reference to the fruit, and means to retain the collar positioned on the stem above the top of the shield.

12. A protector for fruit comprising a flat band or strip of sheet material having terminal ends adapted to encircle a stem carrying fruit, with means to attach said band or strip in the form of a collar encircling the stem, a shield adapted to spread and form a substantially flat structure or to be curved to encircle the bunch of fruit carried by the stem, and a connecting, supporting means between the band or strip forming the collar and the shield, said connecting means being adapted to spread flat or to encircle the stem.

13. A protector for fruit as claimed in claim 12, the shield having stiffening members engaging at least two sides and adapted to fasten together when the said shield encircles the bunch of fruit, and a resilient, expanding strip to encircle the bunch of fruit whereby the shield may be secured in an encircling manner around the bunch of fruit or expanded to facilitate picking of the fruit.

14. A protector for fruit comprising a strip or band having terminal ends adapted to encircle a stem carrying fruit, a packing means on said band adapted to contact with the stem and having the characteristic of expanding when subjected to moisture, a neck structure formed of sheet material having terminal ends to encircle the stem and connected to the said collar, a shield connected to the neck and formed of sheet material having at least two edges adapted to be connected to encircle a bunch of fruit or to be disconnected for picking of the fruit, and a cuff secured to the collar extending downwardly over the said neck and covering part of the shield.

15. A protector for fruit as claimed in claim 14, the said shield being formed of material adapted to transmit sunlight, said material being bendable, and a resilient strip connected to the shield to retain said material in the desired shape encircling a bunch of fruit.

16. A protector for fruit having a shield of sheet material with stiffening rods engaging two edges, means to attach said shield to a stem carrying fruit, a detachable, pivotal connection of the said rods adjacent their upper portion, and a detachable latch connection on the rods adjacent the bottom whereby the shield may encircle a bunch of fruit or the latch may be detached and the rods pivoted on the said pivotal connection.

17. A protector for fruit having a shield formed of sheet material, a neck structure formed of a band of sheet material, the upper end of the shield being secured to the lower part of the neck band, means to secure the neck band around a stem carrying fruit, the sheet material forming the shield having a rod attached to two edges, and a resilient spacing strip connecting the said rods, the rods having a detachable, pivotal connection at the top and a detachable latch connection at the bottom whereby the shield may encircle a bunch of fruit and the said rods be latched together, the said rods being adapted to pivot on the detachable, pivotal connection to spread apart for picking of the fruit.

18. A protector for fruit having a band adapted to form a collar to encircle a stem carrying fruit, a spacing frame adapted to encircle the fruit and having one element engaging the top of the bunch of fruit and another element the under side of the collar, a shield formed of sheet material depending from the collar and having a marginal opening extending downwardly, the said marginal opening having detachable devices to allow opening and spreading apart of the shield, and a netting connected to the lower part of the shield.

19. A protector for fruit comprising a collar structure adapted to be secured around a stem above the fruit, a shield depending from the collar and solely supported thereby, said shield having a disconnectible opening on one side to allow opening of the shield without disconnecting the collar for picking fruit.

20. A protector for fruit comprising a collar structure adapted to be secured around the stem above the fruit, a flexible neck band connected to the collar, and a shield depending from the neck band, the neck band and shield being solely supported by the collar, the shield having a disconnectible opening on one side to allow opening and spreading of the shield for picking of the fruit without detaching the collar.

21. A protector for fruit comprising a collar structure having means for securing same around a stem above a bunch of fruit, a shield having a stiffening member adapted to encircle the bunch of fruit, said shield having a split joint from the top to the bottom and disconnectible at said joint, said stiffening member being adapted to spread the shield when the joint is disconnected for picking the fruit without disconnecting the collar.

22. A protector for fruit comprising a collar structure having means for attachment to a stem carrying a bunch of fruit, a flexible neck band connected to the collar, a shield attached to the lower end of the neck band, such shield having a longitudinal joint from the top to the bottom, and a stiffening member to encircle the bunch of fruit, said shield being disconnectible at the joint, and said stiffening member holding the shield open for picking the fruit without detaching the neck band or collar.

23. A protector for fruit as claimed in claim 22, a spacing frame mounted on the stem above the fruit and engaging the collar to hold the collar spaced above the fruit.

24. A protector for fruit comprising a collar having means to attach same to a stem carrying fruit, a neck band depending from the collar, a shield for the bunch of fruit depending from the neck band, and a cuff connected to the collar and extending over said neck band.

25. A protector for fruit as claimed in claim 24, the neck band having a series of ventilating openings to allow ventilation between the inside of the shield and the under side of the cuff.

26. A protector for fruit comprising a collar in the form of a strip or band adapted to wrap around a stem carrying fruit depending from the stem, the collar having a material expansible when wet, a spring means on the collar to confine such material, stays depending from the collar, a neck band in the form of an elongated strip attached to the stays, a shield formed of sheet material attached at one portion of the neck band and having a binding structure for joining edges, with means to attach such edges, and stiffening material incorporated in the shield, the shield and the neck band being adapted to open to allow picking of the fruit without opening the collar.

27. A protector for fruit as claimed in claim 26, a cuff attached to the collar above the neck band and being in the form of a substantially semi-circular strip of material with fasteners to secure said strip encircling the neck and the upper part of the shield, the cuff being adapted to carry water from the collar past the neck band.

28. A protector for fruit as claimed in claim 26, the shield being formed of material having the characteristics of transmitting sufficient light to facilitate the ripening of the fruit.

29. A protector for fruit as claimed in claim 26, the shield being formed of a wire mesh fabric having a transparent material incorporated in the interstices, such transparent material having the characteristic of transmitting ultra-violet light to facilitate ripening of the fruit.

30. A protector for fruit having a collar structure to secure to a stem above a bunch of fruit, a shield construction secured to the collar and depending therefrom over said bunch of fruit, said shield being constructed of material to transmit light to the fruit.

31. A protector for fruit having a collar structure to secure to a stem above a bunch of fruit, a shield construction secured to the collar and depending therefrom over said bunch of fruit, said shield being constructed of a wire mesh fabric having the interstices filled with a transparent composition, such composition having the characteristic of transmitting ultra-violet light to the fruit.

In testimony whereof I have signed my name to this specification.

ARTHUR LE GRAND.